(12) United States Patent
Shwartz et al.

(10) Patent No.: US 11,086,711 B2
(45) Date of Patent: Aug. 10, 2021

(54) MACHINE-TRAINABLE AUTOMATED-SCRIPT CUSTOMIZATION

(71) Applicant: International Business Machines Corporation, Armonk, NY (US)

(72) Inventors: Larisa Shwartz, Greenwich, CT (US); Victor R. Herrero, Poughkeepsie, NY (US); Victoria Lee Guerra, Yorktown Heights, NY (US); Jose Rizaldy Coronel, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/139,480

(22) Filed: Sep. 24, 2018

(65) Prior Publication Data
US 2020/0097357 A1   Mar. 26, 2020

(51) Int. Cl.
| G06F 11/00 | (2006.01) |
| G06F 11/07 | (2006.01) |
| G06F 11/34 | (2006.01) |
| G06F 8/70 | (2018.01) |
| G06F 9/455 | (2018.01) |
| G06N 20/00 | (2019.01) |

(52) U.S. Cl.
CPC ............ G06F 11/0793 (2013.01); G06F 8/70 (2013.01); G06F 9/45512 (2013.01); G06F 11/3414 (2013.01); G06N 20/00 (2019.01)

(58) Field of Classification Search
CPC ...... G06F 11/00; G06F 11/07; G06F 11/0709; G06F 11/36; G06F 11/2257; G06F 11/2263; G06F 11/22

USPC ...................................................... 714/1–57
See application file for complete search history.

(56) References Cited

U.S. PATENT DOCUMENTS

| 9,152,388 B2 | 10/2015 | Hille-Doering et al. |
| 9,223,647 B2 | 12/2015 | Schwartz et al. |
| 9,304,827 B2 | 4/2016 | Werth et al. |
| 9,678,744 B2 | 6/2017 | Malnati et al. |

(Continued)

OTHER PUBLICATIONS

Anonymous; IPcenter Standard Operating Procedure Recorder for New Virtual Engineers; IP.com; IPCOM000253143D; Mar. 8, 2018; 3 pages.

*Primary Examiner* — Sarai E Butler
(74) *Attorney, Agent, or Firm* — Schmeiser, Olsen & Watts; Stephanie Carusillo

(57) ABSTRACT

A cognitive automation engine receives notice that an unexpected event has occurred in a computing environment. The engine tries to address any resulting problems by running a previously generated automation script, customizing the script as required through cognitive means. If this fails, the engine forwards the script to a human expert for customization. In either case, the engine records any customization activities, extracts parameters from the recording that identify each customization step, cognitively assigns a level of risk to each step based on historical precedent, and determines whether running the customized script presents an unacceptable risk of adverse results. The system adds the revisions, other script-related information, and any results of running the revised script Loin a training corpus. The corpus is then incorporated into a machine-learning procedure that teaches the automation engine how to more intelligently customize a script the next time a similar event occurs.

21 Claims, 6 Drawing Sheets

(56) References Cited

U.S. PATENT DOCUMENTS

| | | | |
|---|---|---|---|
| 9,984,329 B2* | 5/2018 | Winnick | G06N 5/04 |
| 2004/0111727 A1* | 6/2004 | Schwarzbauer | H04L 43/08 |
| | | | 719/310 |
| 2012/0042302 A1* | 2/2012 | Sikandar | G06F 11/3688 |
| | | | 717/125 |
| 2012/0066553 A1* | 3/2012 | Laine | G06F 11/3006 |
| | | | 714/47.2 |
| 2013/0103973 A1 | 4/2013 | Werth et al. | |
| 2014/0245063 A1* | 8/2014 | Baptist | G06F 3/06 |
| | | | 714/6.22 |
| 2015/0046909 A1* | 2/2015 | Ligman | G06F 11/3688 |
| | | | 717/131 |
| 2016/0055327 A1* | 2/2016 | Moran | G06K 9/00899 |
| | | | 726/19 |
| 2016/0294621 A1 | 10/2016 | Werth et al. | |
| 2016/0306965 A1* | 10/2016 | Iyer | G06F 21/552 |
| 2016/0378756 A1* | 12/2016 | Kemp | G06F 16/24565 |
| | | | 707/722 |
| 2017/0228220 A1 | 8/2017 | Dai et al. | |
| 2018/0284735 A1* | 10/2018 | Celia | G05B 13/028 |
| 2018/0285248 A1* | 10/2018 | Gupta | G06F 11/3684 |
| 2018/0295142 A1* | 10/2018 | Manadhata | H04L 63/1416 |
| 2019/0087311 A1* | 3/2019 | Donaldson | G06N 3/08 |
| 2019/0196952 A1* | 6/2019 | Manchiraju | G06F 11/3688 |
| 2019/0294536 A1* | 9/2019 | Avisror | G06F 11/3688 |
| 2019/0339821 A1* | 11/2019 | Vajjala | G06F 11/36 |

* cited by examiner

MACHINE-TRAINABLE AUTOMATED-SCRIPT CUSTOMIZATION

BACKGROUND

The present invention relates in general automating the operation and management of computing environments and in particular to using machine-learning technology to train a cognitive automation engine to intelligently customize automation scripts.

Computer-based systems and operating environments encounter unexpected conditions that disrupt normal operation. For example, a server may report unacceptably high CPU usage, an application may experience excessive response times, network bandwidth may drop to a level insufficient to satisfy user demand, a user's workstation may freeze, or a disk drive's available storage capacity may fall below a threshold value.

When such an event occurs, the computing environment can attempt to automatically resolve the problem by calling on an automation-engine component to run an automated remedial script. Predefined automation scripts may each be designed to automatically implement a known solution to a common type of event, such as a system crash that requires a system reboot or a memory-overutilization condition that can be solved by terminating a looping software process.

Automation-engine technology can be made more flexible by incorporating template scripts that are each tailored for a particular class of event. When no preexisting script perfectly matches a specific issue, compliant automation engines can instead generate a new, better-targeted script by customizing a stored template.

Certain automation engines can automatically perform simple script customizations, such as amending a script to identify a specific user space, application, communications protocol, or data-storage location. But even those engines generally customize templates by means of unsophisticated, noncognitive methods like direct parameter mapping or pattern-matching. Such methods are not able to detect and address common, but unanticipated, problems like noncompliance with file-naming or data-storing locations; an unorthodox shell configuration; user-specific workspace modifications; an undocumented software update; or other unexpected alterations in a system or application function, configuration, or interface.

Known automation-engine technology, therefore, cannot support template-script functionality without at least occasionally requiring a human expert to customize a template. This constraint reduces efficiency, introduces the risk of human error, creates potential maintenance problems should the human expert be unavailable during a script failure, and can bloat a system with narrowly applicable scripts that are never needed a second time.

Such problems are especially troublesome in a cloud-computing environment, where a continuously changing array of Software as a Service (SaaS), Infrastructure as a Service (IaaS), and Platform as a Service (PaaS) clients each work in a virtual user space dedicated to that client's specific needs. In such a cloud environment, the rudimentary customization features of today's automation-engine technology can result in the creation of large, redundant sets of custom scripts, each able to address unexpected events in only one hosted user space.

There is thus a need for an improved, cognitive automation engine capable of more intelligent and flexible template-script customization and that can be trained to perform such customizations automatically without human intervention.

SUMMARY

An embodiment of the present invention is a cognitive automation-engine system that is trained by methods of machine learning to provide improved, artificially intelligent script-customization functionality. This system includes a processor, memory, and a computer-readable hardware storage device containing program code configured that is run by the processor to perform a method for machine-trainable automated-script customization. In response to receiving notice that an unexpected event has disrupted the system's computing environment, the processor selects, from a script library, an automation script that is configured to address the type of problems caused by the disruption. The processor attempts to intelligently customize the selected script into a customized script that more specifically addresses the particular type of disruption associated with the unexpected event. If this attempt fails, the system requests assistance from a human expert. In either case, activities leading to each identified customization step is recorded by a customization-recorder module of the automation engine. The processor then uses cognitive methods to identify a relative risk to the computing environment posted by each customization step and a resulting aggregate risk of running the entire customized script. If the aggregate risk exceeds a certain threshold limit, the engine requests special authorization to run the customized script. If the script has low aggregate risk or is otherwise authorized to be run, the system generates and runs the script, adds the customized script to the script library, and directs a recording module to record the result of running the script. The processor then adds to a machine-learning corpus information describing the unexpected event, the adverse effects, the original and customized scripts, the customization steps, the degrees of risk of the customized script and of each step, and the results of running the customized script. An engine-training module submits this corpus to the automation engine during the next machine-learning training session in order to train the engine to more intelligently customize automation scripts.

Another embodiment of the present invention is a method for machine-trainable automated-script customization that provides improved, intelligent script-customization functionality. This method begins with processor of a cognitive automation engine responding to notice that an unexpected event has disrupted the system's computing environment, the processor selects, from a script library, an automation script that is configured to address the type of problems caused by the disruption. The processor attempts to intelligently customize the selected script into a customized script that more specifically addresses the particular type of disruption associated with the unexpected event. If this attempt fails, the system requests assistance from a human expert. In either case, activities leading to each identified customization step is recorded by a customization-recorder module of the automation engine. The processor then uses cognitive methods to identify a relative risk to the computing environment posted by each customization step and a resulting aggregate risk of running the entire customized script. If the aggregate risk exceeds a certain threshold limit, the engine requests special authorization to run the customized script. If the script has low aggregate risk or is otherwise authorized to be run, the system generates and runs the script, adds the customized script to the script library, and directs a recording module to record the result of running the script. The processor then adds to a machine-learning corpus information describing the unexpected event, the adverse effects, the original and customized scripts, the customization steps, the degrees of risk of the customized script and of each step, and the results of running the customized script. An engine-training module submits this corpus to the automation engine during the next machine-learning training session in order to train the engine to more intelligently customize automation scripts.

Yet another embodiment of the present invention is a computer program product including a computer-readable storage medium storing computer-readable program code that is compatible with cognitive automation-engine system that includes a processor, a memory coupled to the processor, and a computer-readable hardware storage device coupled to the processor. The stored program code is configured to be run by the processor via the memory to perform a method for machine-trainable automated-script customization that provides improved, intelligent script-customization functionality. This method begins with processor of a cognitive automation engine responding to notice that an unexpected event has disrupted the system's computing environment, the processor selects, from a script library, an automation script that is configured to address the type of problems caused by the disruption. The processor attempts to intelligently customize the selected script into a customized script that more specifically addresses the particular type of disruption associated with the unexpected event. If this attempt fails, the system requests assistance from a human expert. In either case, activities leading to each identified customization step is recorded by a customization-recorder module of the automation engine. The processor then uses cognitive methods to identify a relative risk to the computing environment posted by each customization step and a resulting aggregate risk of running the entire customized script. If the aggregate risk exceeds a certain threshold limit, the engine requests special authorization to run the customized script. If the script has low aggregate risk or is otherwise authorized to be run, the system generates and runs the script, adds the customized script to the script library, and directs a recording module to record the result of running the script. The processor then adds to a machine-learning corpus information describing the unexpected event, the adverse effects, the original and customized scripts, the customization steps, the degrees of risk of the customized script and of each step, and the results of running the customized script. An engine-training module submits this corpus to the automation engine during the next machine-learning training session in order to train the engine to more intelligently customize automation scripts.

Still another embodiment of the present invention is a whitelist/blacklist-based cognitive automation-engine system that is trained by methods of machine learning to provide improved, artificially intelligent script-customization functionality. This system includes a processor, memory, and a computer-readable hardware storage device containing program code configured that is run by the processor to perform a method for machine-trainable automated-script customization. In response to receiving notice that an unexpected event has disrupted the system's computing environment, the processor selects, from a script library, an automation script that is configured to address the type of problems caused by the disruption. The processor attempts to intelligently customize the selected script into a customized script that more specifically addresses the particular type of disruption associated with the unexpected event. If this attempt fails, the system requests assistance from a human expert. In either case, activities leading to each identified customization step is recorded by a customization-recorder module of the automation engine. The processor then uses cognitive methods to identify a relative degree of risk to the computing environment posted by each customization step and a resulting aggregate risk of running the entire customized script. The relative degrees of risk are at least in part selected by searching through one or more whitelists and blacklists for entries that identify each customization step. A step found in a whitelist is deemed to have a lower level of risk associated with that whitelist, and a step found in a blacklist is deemed to have a higher level of risk associated with that blacklist. If the aggregate risk exceeds a certain threshold limit, the engine requests special authorization to run the customized script. If the script has low aggregate risk or is otherwise authorized to be run, the system generates and runs the script, adds the customized script to the script library, and directs a recording module to record the result of running the script. The processor then adds to a machine-learning corpus information describing the unexpected event, the adverse effects, the original and customized scripts, the customization steps, the degrees of risk of the customized script and of each step, and the results of running the customized script. An engine-training module submits this corpus to the automation engine during the next machine-learning training session in order to train the engine to more intelligently customize automation scripts.

Another embodiment of the present invention is a cognitive automation-engine system that is trained by methods of machine learning. This system consists of hardware and software modules organized and connected in a specific structure to provide improved, artificially intelligent script-customization functionality. These modules include a processor, memory, and a computer-readable hardware storage device containing program code configured that is run by the processor to perform a method for machine-trainable automated-script customization. A script library stores previously recorded automation scripts. A customization-recorder module monitors and records identifications of data structures and activities related to the customization of a previously stored (or newly derived) automation script. These recording may include identifications of: an unexpected event that produces an adverse effect on a computing environment, a selection of a previously stored automation script from the script library, a customized script generated by applying customization steps to the selected script, the customization steps, a relative risk that running an automation script comprising an instruction associated with a first customization step of the customization steps would adversely affect operation of the computing environment, and an aggregate risk that running the customized script would adversely affect operation of the computing environment. An engine-training module trains a customization module to intelligently customize automation scripts. One or more corpora store historical training material that is submitted to the customization module by the engine-training module during machine-learning training sessions. The customization module, in response to receiving notice that an unexpected event has disrupted the system's computing environment, the customization module selects, from a script library, an automation script that is configured to address the type of problems caused by the disruption. The customization module then attempts to intelligently customize the selected script into a customized script that more specifically addresses the particular type of disruption associated with the unexpected event. If this attempt fails, the system requests assistance from a human expert. In either case, the customization module directs the customization recorder to record human or automated activities leading to each identified customization step. The customization module then uses cognitive methods, learned through the machine-learning trainings sessions, to identify a relative risk to the computing environment posted by each customization step and a resulting aggregate risk of running the entire customized script. If the aggregate risk exceeds a certain threshold limit, the customization module requests special authorization to run the customized script. If the script has low aggregate risk or is otherwise authorized to be run, the customization module generates and runs the script, adds the customized script to the script library, and directs a recording module to record the result of running the script. The customization module then adds to the one or more machine-learning corpora information describing the unexpected event, the adverse effects, the original and customized scripts, the customization steps, the degrees of risk of the customized script and of each step, and the results of running the customized script. The automation engine directs the engine-training module to use the updated corpora during the next machine-learning training session in order to train the customization module to more intelligently customize automation scripts.

DETAILED DESCRIPTION

Figure 1:
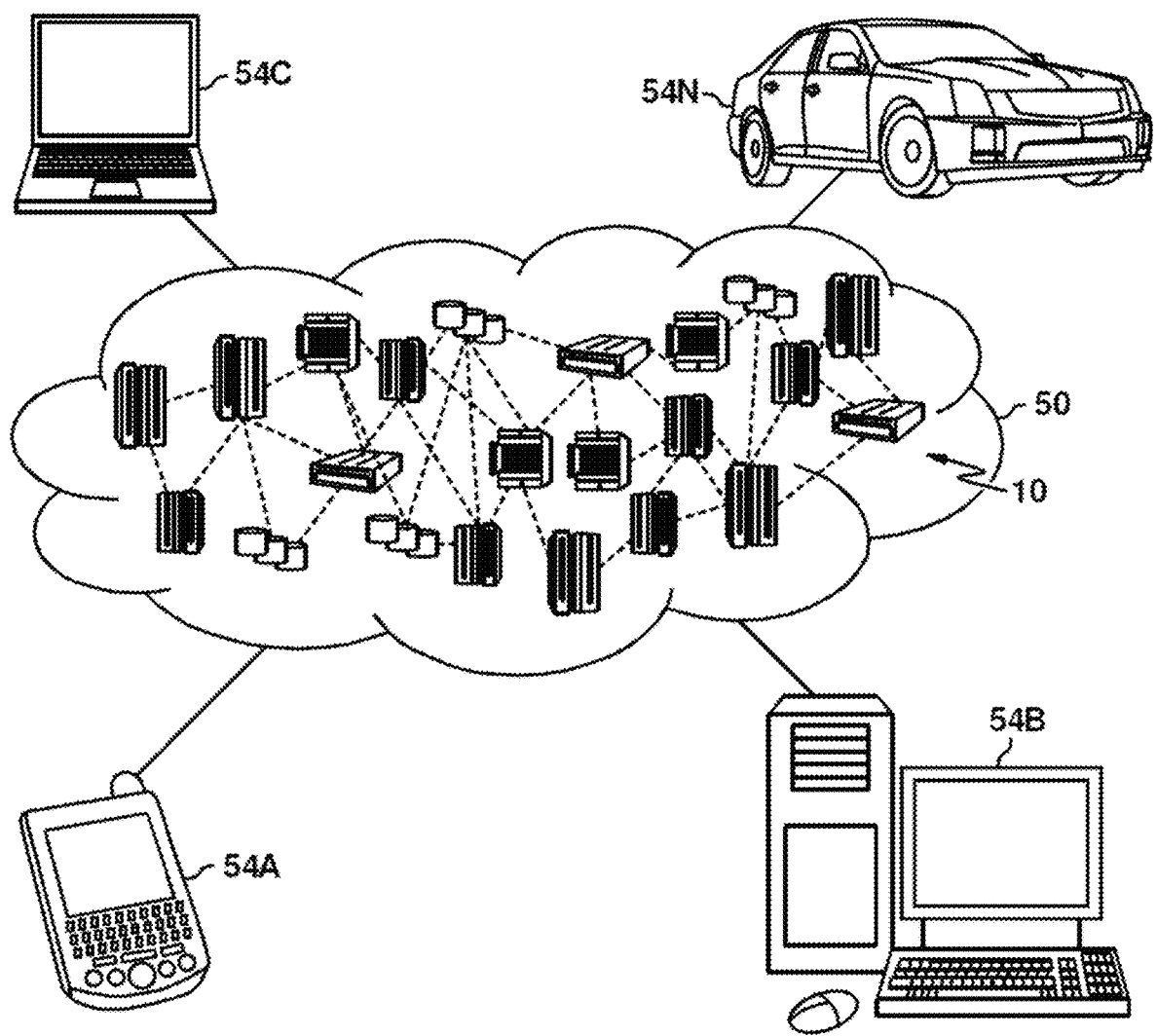
FIG. 1 depicts a cloud computing environment according to an embodiment of the present invention.

Automation-engine technology is incorporated into the management platforms of certain computer systems in order to allow the systems to more quickly and reliably recover from crashes, error conditions, and other unexpected events. Automation engines respond to a notification that an event has occurred by running a script that directs the engine to initiate steps for resolving problems resulting from the event.

For example, if an application unexpectedly terminates in a particular user's cloud-hosted workspace, the cloud's cloud-management platform would direct an automation engine to perform a series of actions listed in a stored script. These actions would attempt to end all hanging processes associated with the application in the user's workspace and then restart a clean version of the application in the workspace.

In another example, a system-management stack may determine that a workstation appears to have lost connectivity. The management stack would then, in response, direct a component automation engine to retrieve and run a script that enumerates a series of system calls that perform common diagnostic steps, such as reinitializing the workstation port or pinging the workstation's node to determine whether connectivity has been completely lost, and filing a service ticket if necessary.

One problem with this technology is that each stored script must be well-adapted to handle the unexpected event. Without more, this limits the system to only the most basic, generic types of problems and resolutions, such as restarting a virtual machine that has become unresponsive. In other cases, the automation engine must be given a script that has been manually customized by a human administrator. Such a compromise fails to provide much of the efficiency and robustness of a fully automated response.

Certain automation technologies attempt to be more flexible by storing generalized template scripts that each address a broader class of possible events. For example, rather than merely enumerating steps for restarting a specific failed transaction-processing application, a broader template script would comprise steps common to procedures for restarting numerous types of crashed applications. Similarly, instead of addressing problems that arise only when available storage space of a specific mission-critical server falls below a threshold value, a template script would contain steps for increasing available space on any type of overutilized storage device. Because of their general nature, a template script may need to be customized before being run, in order to tailor the template to event-specific details or to event-specific problems that result from the occurrence of the event.

Some automation engines can automatically customize a template script, but such a customization is limited to simple substitutions that can be performed through rudimentary mapping functions. For example, a script that specifies a general solution for problems that arise when backing up a database would need to be customized with the names of the database and of a backup storage medium. Such customization could be performed through a simple table look-up or by extracting the database name and failed data-transfer transaction from a system-generated or application-generated error log. In the current state of the art, more complex or nuanced customizations generally require a human expert to manually revise a template script.

Embodiments of the present invention improve upon known automation technology by incorporating a trainable, cognitive automation engine capable of learning how to automatically customize scripts. This engine continuously improves its ability to perform complex customizations by using machine-learning technology, which allows the engine to gain "experience" in the art of customization by considering the results of customization efforts made in the past.

Unlike conventional programmed software that makes decisions based on static preprogrammed instructions, a machine-learning program eventually learns how to choose its responses to specific inputs or conditions, based on historical data submitted to the program in a data structure known as a corpus. Each machine-learning training session comprises submitting one or more corpora to the program, allowing the program to determine the effectiveness of alternative responses to particular inputs or sets of conditions. Eventually, the program gains sufficient expertise in the field to react with human-like intelligence and creativity.

The present invention's improved cognitive automation engine 410 comprises:

a recorder component 425 that tracks automated or manual customization steps made to template scripts, and records the results of running a customized script;

a cognitive or artificially intelligent, machine-trainable customization module 415 that infers semantic meaning from the recorded customization steps and determines whether running a customized script is likely to present an operational risk to the computing environment 4000;

a training subsystem 440 of the automation engine 410 (optionally implemented as a distinct component of the maintenance/management platform that comprises the automation engine 410) that uses methods of machine-learning to train the customization module. This subsystem's training module 430 submits to customization module 415 one or more corpora 435 from which module 415 may determine the safety and successfulness of various types of customization strategies. As customization module 415 gains expertise in this way, it learns to more effectively customize scripts, without human intervention, in an intelligent, human-like manner that is impossible in the known state-of-the-art and to perform such customizations with even less risk to the computing environment than would be possible through manual customization methods.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
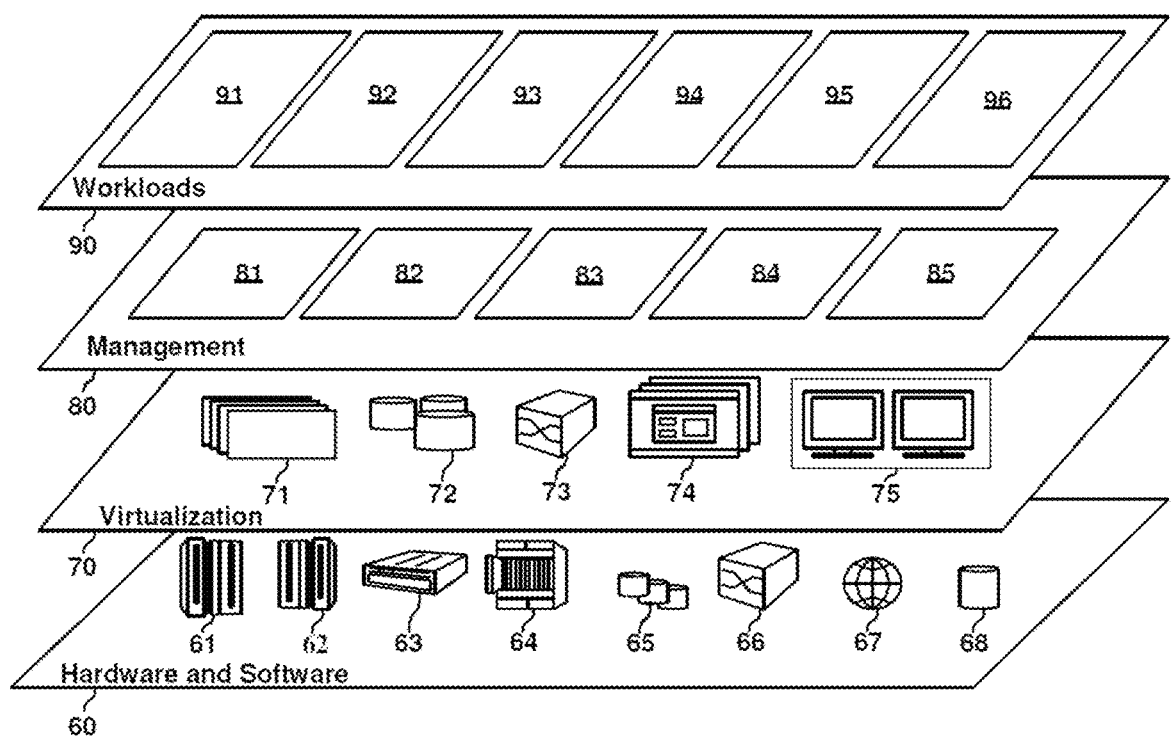
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex machine-learning and script-customization tasks performed by a cognitive automation engine 410.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
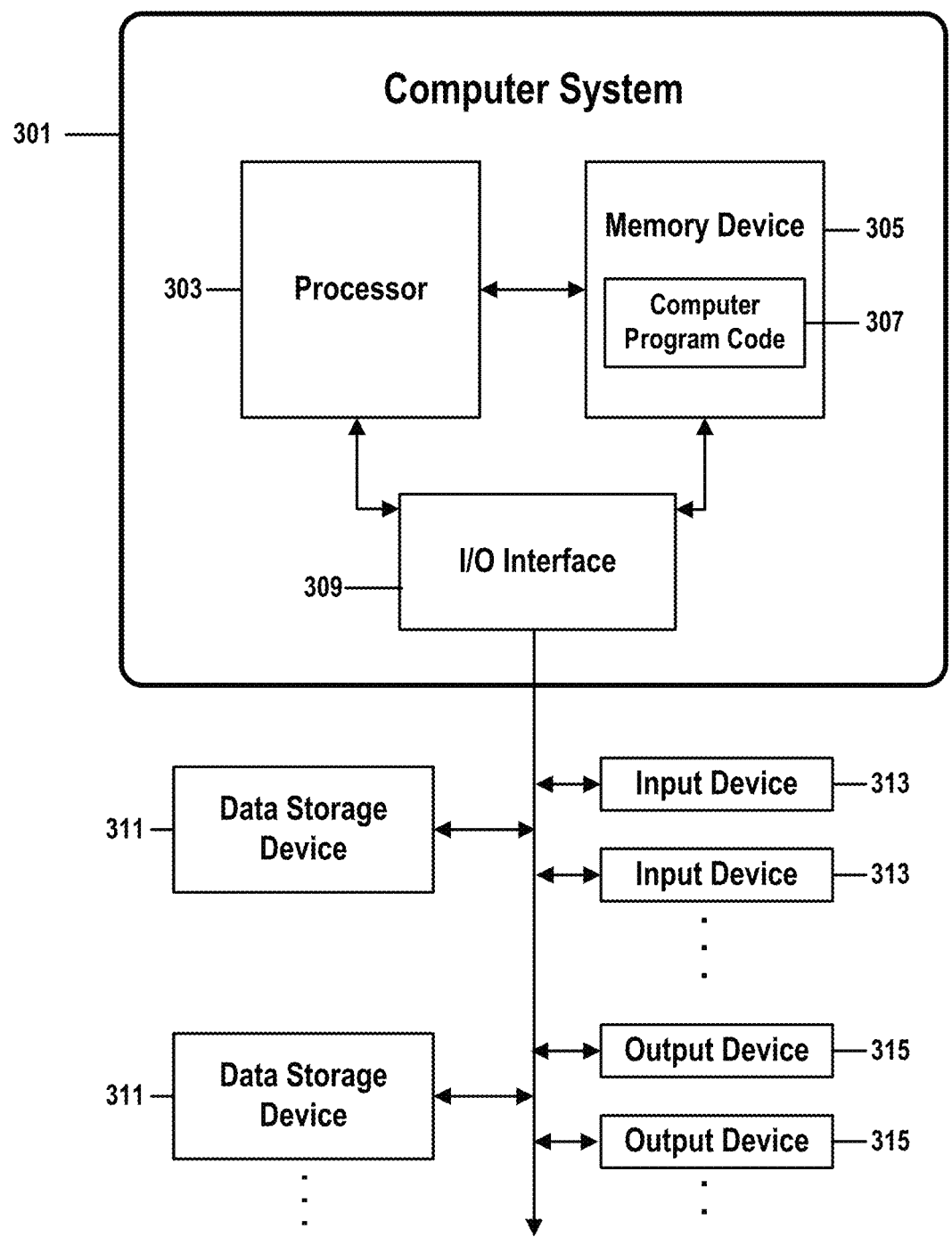
FIG. 3 shows the structure of a computer system and computer program code that may be used to implement a method for machine-trainable automated-script customization in accordance with embodiments of the present invention.

FIG. 3 shows a structure of a computer system and computer program code that may be used to implement a method for machine-trainable automated-script customization in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for machine-trainable automated-script customization in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for machine-trainable automated-script customization.

Any of the components of the present invention could be created, integrated, hosted, maintained, deployed, managed, serviced, supported, etc. by a service provider who offers to facilitate a method for machine-trainable automated-script customization. Thus the present invention discloses a process for deploying or integrating computing infrastructure, comprising integrating computer-readable code into the computer system 301, wherein the code in combination with the computer system 301 is capable of performing a method for machine-trainable automated-script customization.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for machine-trainable automated-script customization may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for machine-trainable automated-script customization is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
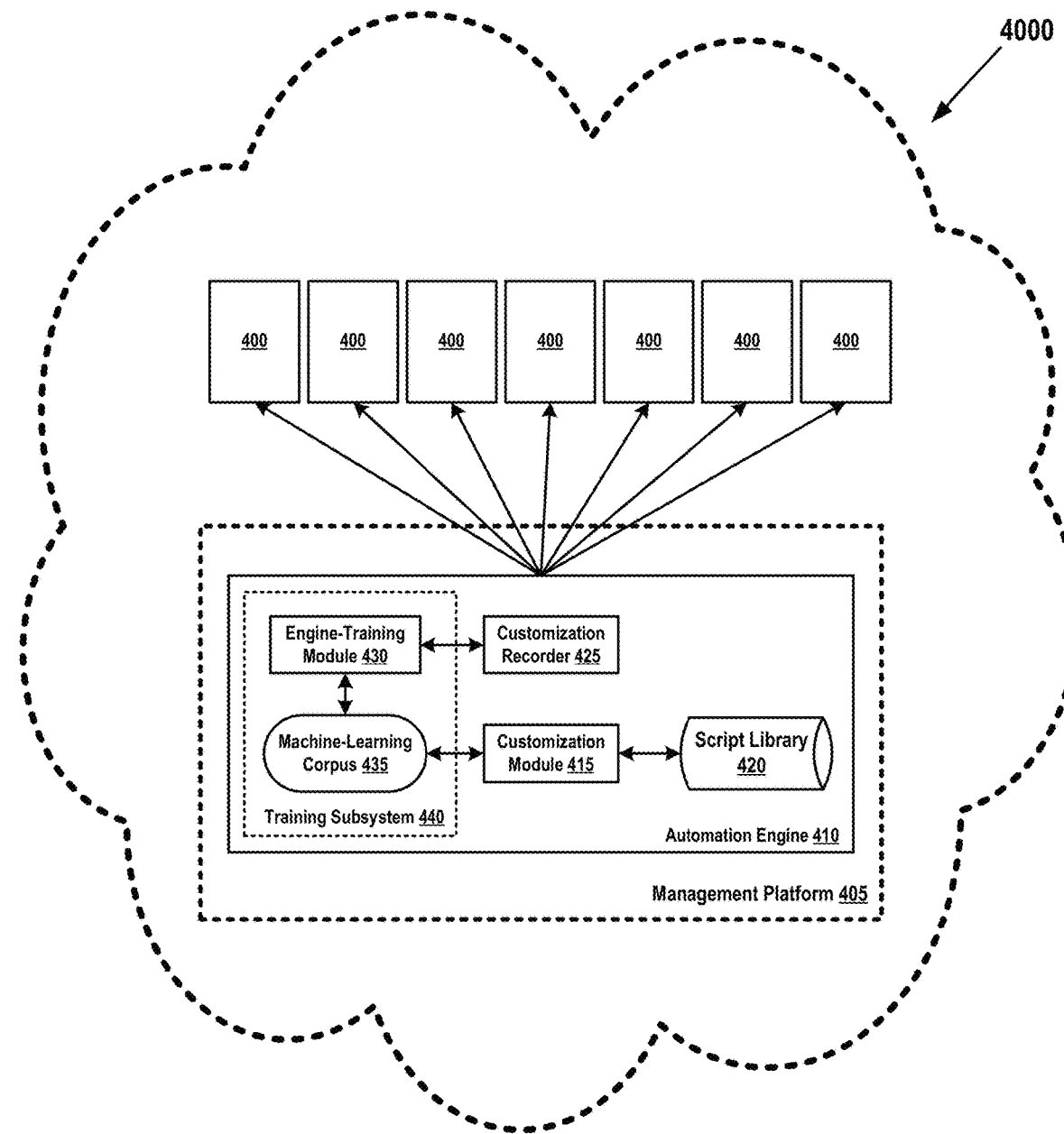
FIG. 4 shows a more detailed structure of an embodiment of the present invention.

FIG. 4 shows a more detailed structure of an embodiment of the present invention. FIG. 4 shows items 400-440 and 4000.

Item 4000 is a computing environment that is managed by a management platform 405. If, for example, environment 4000 is a hosted cloud-computing environment, management platform 405 would be a cloud-management stack or other type of cloud-management platform. Similarly, if environment 4000 is a non-virtualized, distributed enterprise computing system, management platform 405 would be a system-management component of an operating system or a network-management console.

If computing environment 4000 is a multi-user environment, each user of computing environment 4000 may work within a user-specific workspace 400. If computing environment 4000 is a single-user environment, environment 4000 comprises only a single instance of a workspace 400.

In embodiments of the present invention, system-management platform 405 comprises a cognitive automation engine 410 that automatically customizes and runs automation scripts in response to the occurrence of an unexpected condition in computing environment 4000. System-management platform 405 also comprises a training module 430 that trains the automation engine 410 to intelligently customize template scripts. This training is performed by methods of machine-learning that submit training data, in the form of corpus 435, to automation engine 410. In some embodiments, training module 430 or corpus 435 may be components of automation engine 410.

Automation engine 410 comprises, among other components, a trainable customization module 415 that learns how to customize automation scripts and template scripts, retrieved from a script library 420, by analyzing historical information contained in one or more machine-learning corpora 435 submitted to the customization module 415 by engine-training module 430. Training module 430 determines in part how to update corpus 435 by analyzing historical recordings or logs from which may be inferred the success rates and results of previous attempts to customize a script. These recordings and logs may be gathered by customization-recorder module 425 from either automated or human-implemented script customizations.

In some embodiments training module 430 and corpus 435 are comprised by a machine-language training subsystem 440 of the automation engine 410. In other embodiments subsystem 440, including its components 430-435, is implemented as a distinct module of management platform 405, and is not comprised by automation engine 410. In the latter case, certain embodiments may allow the training subsystem to train other software components through similar methods of machine-learning.

Figure 5:
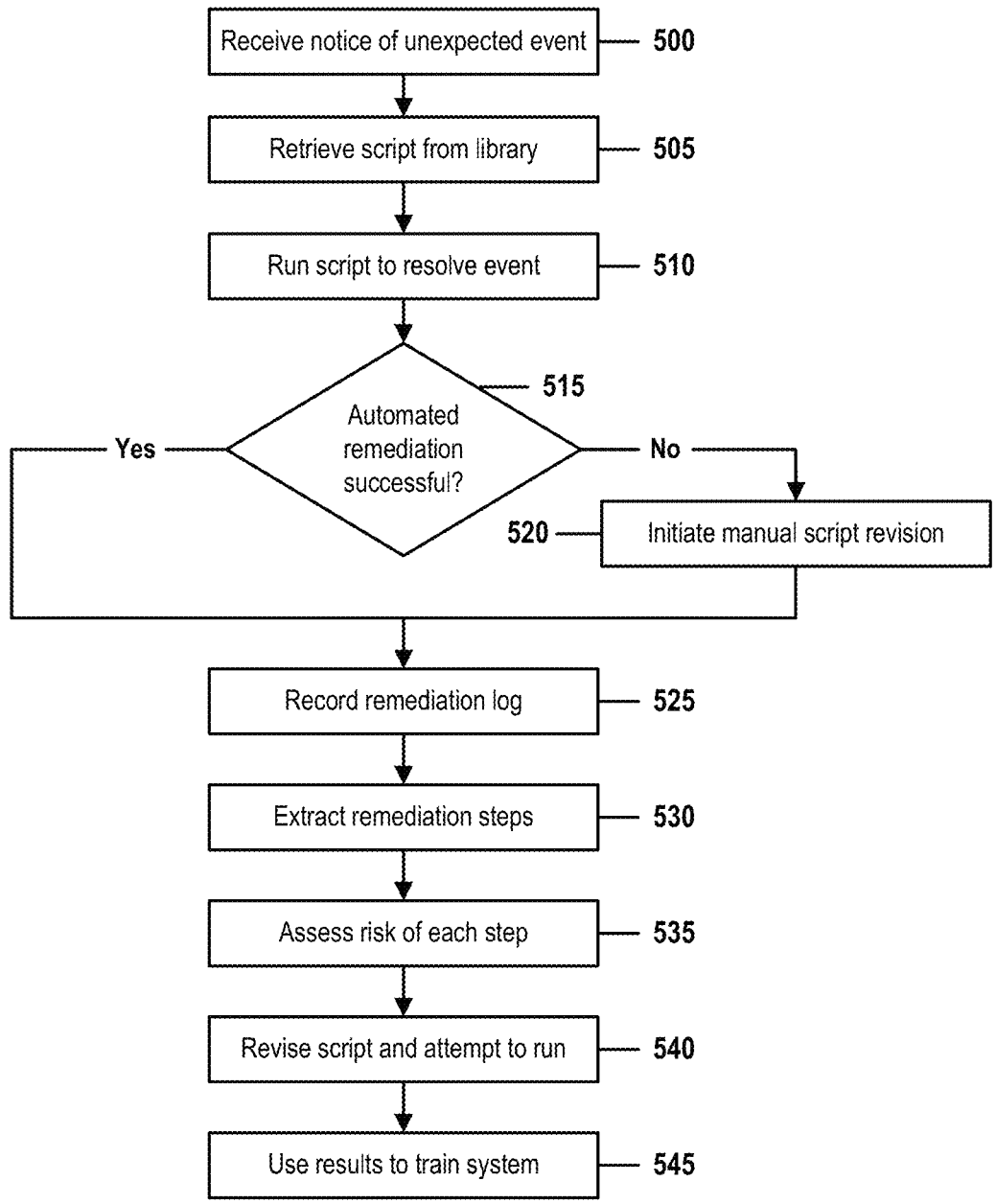
FIG. 5 is a flow chart that illustrates steps of a method for machine-trainable automated-script customization in accordance with embodiments of the present invention.

FIG. 5 is a flow chart that illustrates steps of a method for machine-trainable automated-script customization in accordance with embodiments of the present invention. FIG. 5 contains steps 500-545, which may be performed by embodiments that incorporate the structures of FIG. 4.

In step 500, automation engine 410 receives notice from a component of computing environment 4000 that an unexpected event has occurred within environment 4000. The unexpected event may be a hardware or software fault, an error condition, a configuration mismatch, a communications failure, or any other type of event that requires remediation in order for the computing environment 4000 to continue to function properly.

In step 505, automation engine 410 responds to the notice by identifying an appropriate automation script stored in script library 420 and by then retrieving the identified script. This identification may be performed by any means known in the art, such as by using script metadata to identify a category or class of the script or of an event that is associated with the script; or by selecting a script by an index search into a relational database. For example, if the unexpected event was a failure of a transaction-processing application with an error code #4023, the system would search for scripts identified by database indices or metadata identifying the application and the error code.

In some embodiments, the selected script may not be retrieved from script library 420, but may instead be a blank template, or a mere placeholder document. This may occur in embodiments and in cases where no script stored in library 420 is deemed to be sufficiently appropriate for responding to the unexpected event, or when an embodiment includes a feature allowing methods of FIGS. 5 and 6 to be performed on a blank script. In such cases, customization steps would comprise steps that add instructions and branches, as a function of recommendations of human experts or of cognitive inferences drawn by customization module 415 as a function of customization module 415's prior machine-learned experience with historical records. In such cases, identified customization steps might generate customized script almost completely from scratch.

In step 510, automation engine 410 attempts to automatically run the script in order to resolve problems or issues arising from the unexpected event. If automation engine 410 determines that the retrieved script must be customized in order to address the specific event that has occurred, customization module 415 of the automation engine 410 attempts to customize the script prior to running the script.

Customization may occur at this point in several ways. If automation engine 410 includes known customization features, such as revising the script by means of a simple pattern-matching substitution procedure, automation engine 410 may attempt such a customization at this point.

If, however, automation engine 410 has been sufficiently trained, by means of machine-learning methods described below and in FIG. 6, engine 410 may attempt to intelligently customize the script, using cognitive methods.

For example, if automation engine 410 has developed a knowledgebase with rules that define precisely how to customize a template script to resolve a CPU-overutilization issue, customization engine 410 may rewrite the retrieved script in order to more successfully address an unexpected event that comprises a CPU-overutilization condition. This rewriting may comprise adding branches to the script that attempt to diagnose the cause of the overutilization condition and, if determining that the condition has been caused by an unterminated process, responding by directing the operating system to terminate the offending process. In this example, the rules that determine this particular customization will have been developed in response to historical training data received as one or more corpora 415 by customization module 415. This historical training data would have contained logs of past attempts to address similar problems, along with records indicating the degree of success provided by each candidate solution.

In yet other cases, automation engine 410 may simply run the retrieved automation script in the form in which it was stored. This would happen, for example, in cases where the stored script is an exact match for an event that is generic or common enough to justify the creation of a script dedicated to remediating issues associated with that event.

In certain instances, automation engine 410 may not run a retrieved script. This may happen if engine 410 is unable to locate a script that is appropriate or capable of addressing the unexpected event, or if engine 410 determines that the script requires such extensive customization that it would be impossible to successfully run the script in its original form. In some cases, a template script may even have been expressly designed so as to require customization before being performed.

In step 515, the automation engine 410 or management platform 405 determines whether the automatic remedial action was successful. This step may be performed by any means known in the art, such as through system calls to a host operating system or hypervisor, through API calls, or through transactional messages exchanged with an application. In certain embodiments, this determination may be made as a function of an interactive or other communication with an administrator or other user.

If the system in step 515 determines that the automated remediation was not successful, the automation engine 410 or management platform 405 requests that a human expert, such as a system administrator or application specialist, manually customize the retrieved script (or select a different script), using expert knowledge.

In step 520, the human expert may manually customize the retrieved script by any means known in the art or preferred by an implementer, such as by manually editing a textual or graphical representation of the script, or by entering commands into an interactive user interface that directs the processor to customize the script in certain ways.

Regardless of how or whether the retrieved script is customized or whether the script successfully runs to completion, the manual or automated customizations of steps 510-520 are monitored by customization recorder 425 of automation engine 410.

In step 525, recorder 425 stores the monitored customization steps in a remediation log. This log may take any form known in the art that is capable of storing information from which may be extracted or inferred semantic meanings of each customization step and the result of performing the customized script. In its simplest form, a remediation log could be a simple keystroke log that merely records the commands typed by a human expert when editing the retrieved script. If an expert edits the script in an integrated application development environment, the log might include only relevant logical revisions, such as a listing of each added or revised instruction generated by the expert.

In some embodiments, recording is initiated when customization efforts are initiated, or is terminated when it becomes known that an issue associated with the unexpected event has been successfully resolved.

In step 530, customization module 415 of automation engine 410 receives and processes the remediation log from recorder module 425 of automation engine 410. This process comprises any procedures known in the art for extracting information from a data file.

For example, it is possible to extract phrases that contain known keywords (such as operators or instructions in the scripting language used to write the customized script) or to search for character strings that match certain character patterns (such as a filepathname, a known name of a server, application, or network node, or a URL). It is also possible to perform a line-by-line comparison of the original retrieved script and the customized script to identify newly added or revised branches, or to detect other differences, such as variations in parameters or switches of a command line, a different path or filename extension of a stored file, a different operator in a logic statement, or different user log-in credentials.

Certain embodiments may use cognitive or artificially intelligent methods in this step, such as semantic analytics, natural-language processing, or text analytics, to infer semantic meaning from portions of the recording. In this way, an embodiment can apply expertise, which may have been previously gained from machine-learning-based training or from previous performances of the method of FIG. 5, to understand how a human expert would manually attempt to address issues raised by specific types of unexpected events. These manual attempts do not necessarily comprise an attempt to edit a script, and embodiments do not even require the expert to be aware that automation scripts exist.

At the conclusion of step 530, the automation engine 410 will have enumerated a list of steps extracted from the remediation log, where those steps each identify one customization made, either automatically or manually, to the retrieved script. In some embodiments, step 530 and subsequent steps are not performed if the retrieved script in step 510 ran successfully without customization. In other embodiments, subsequent steps will be performed in order to supply the training corpus 435 with historical data indicating that the retrieved script successfully addressed issues associated with the specific type of event detected in step 500.

In step 535, the customization module 415 assigns a relative degree of risk to each script-customization step enumerated in step 530 of FIG. 5. Here, risk may be defined in any manner known in the art and desired by an implementer. For example, a customization step can be deemed to be "high risk" or "low risk" as a function of whether performances of that step have in the past resulted in certain undesirable outcomes a certain percent of the time. An undesirable outcome could be any result that disables an essential function of computerized operating environment 4000 or of an application running within environment 4000.

The identification of relative risk may also be performed by any means desired by an implementer. For example, an embodiment could represent each enumerated customization as a vector or n-tuple that identifies certain data elements associated with that particular customization step. Such data elements could include the name of an NAS (network-attached storage) server identified by the step, a script command performed by the step, and configuration parameters of the script command.

Such an embodiment could then use blacklists and whitelists to assign relative degrees of risk to the step. For example, the customization engine 415 could associate a vector (<location1>, <cmd1>, <par1>, <par2>, <par3>) with a high risk if the engine 415 finds that particular combination of location, command, and parameters enumerated on a blacklist. Similarly, customization engine 415 could associate a vector (<location2>, <cmd2>, <par1>, <par2>, <par4>) with a low risk if that particular combination of location, command, and parameters can be found in a whitelist.

In such embodiments, whitelist and blacklist entries may be created by automation engine 410 in response to the past performance of customization steps that comprised specific vector combinations. In one example, any step comprising a vector that resulted in the disruption of a mission-critical operating-system resource would automatically result in the creation of a blacklist entry listing that combination. Similarly, any step comprising a vector that resulted in the disruption of no resources would automatically result in the creation of a whitelist entry listing that combination. Any step comprising a vector that has previously disrupted a noncritical resource, but has done so less than twice during the most recent 100 performances, would not be included on either list.

The present invention are flexible enough to accommodate embodiments that comprise many other risk-assessment rules for determining relative degrees of risk. Some embodiments may use cognitive or machine-learnable methods to automatically generate rules that are consistent with an embodiment's historical performance. Other embodiments allow rules to, at least initially, be manually entered by an administrator.

For example, an embodiment may assign vectors continuously variable degrees of risk depending on the proportion of adverse effects produced in the past by each vector. For example, the last 1000 performances of a first step that comprises first combination of location, command, and parameters may have caused three adverse effects, while the last 1000 performances of a second step that comprises second combination of location, command, and parameters may have caused six adverse effects. In this example, the second step would be associated with twice the level of risk that is associated with the first step.

In yet another example, if an enumerated step is associated with a vector that identifies a previously unknown combination of elements, customization module 415 could extrapolate a degree of risk based on risks associated with an element of the combination that is found in other combinations. Here, if vector (<location1>, <cmd1>, <par1>, <par2>, <par3>) is a new combination with which customization module 415 is unfamiliar, module 415 might search the whitelists and blacklists for other vectors that identify <location1>, <cmd1>, or other locations or commands that are similar in some way (such as other hard drives configured into the same RAID array as <location1> or a script command that performs the same class of function as <cmd1>). If these subsets of the vector combination are found with frequency in a whitelist or blacklist, module 415 might infer that the vector shares risk characteristics with the discovered vectors.

Despite these many possibilities, all embodiments in step 535 use some sort of inferential, cognitive, or other method to assign each enumerated customization step a relative degree of risk of causing an adverse effect on operating environment 4000.

Figure 6:
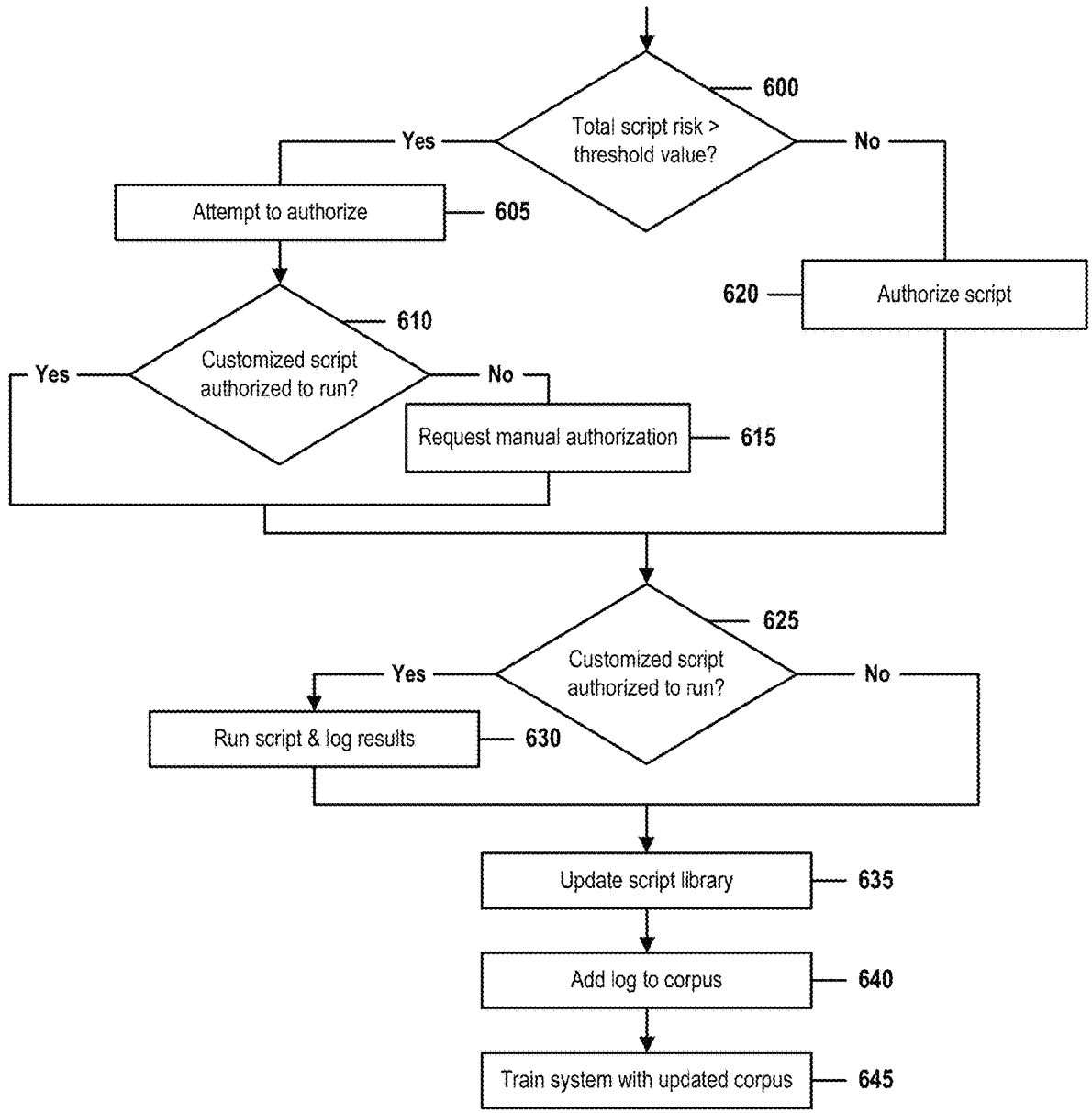
FIG. 6 is a flow chart that presents in greater detail the final steps of the method for machine-trainable automated-script customization described in FIG. 5.

Steps 540 and 545 are described in greater detail in FIG. 6

In step 540, customization module 415 uses these risk determinations to assign an overall degree of risk to the entire customized script. This overall risk is then used to determine whether to run the customized script.

In step 545, customization module 415 uses the procedures and results of steps 500-540 to update machine-learning training corpus 435. The updated corpus 435 is then submitted to the customization module 415 in order to train the automation engine 410 to more intelligently customize future scripts.

This training process may continue until automation engine 410 is deemed to have a success rate in customizing retrieved scripts that is at least equivalent to that of a human expert. In some embodiments, the machine-language training steps will continue indefinitely, allowing the automation engine 410 to continuously improve itself.

FIG. 6 is a flow chart that presents in greater detail steps 540-545 of the method for machine-trainable automated-script customization described in FIG. 5. FIG. 6 contains steps 600-645, which may be performed by embodiments that incorporate the structures of FIG. 4.

In step 600, customization module 415 uses these risk determinations to assign an overall degree of risk to the entire customized script. This overall risk is then used to determine whether to run the customized script.

Embodiments of the present invention are flexible enough to accommodate any script-risk assignment step desired by an implementer. For example, an embodiment might assign a 0-100 or 1-10 ranking of the risk severity of each customization step and then select an overall risk to the entire script by averaging the risk values of each step. Other embodiments may use a weighted average or an average of values that fall within (or outside) of a range of standard deviations from the mean of the step risk values. In yet other embodiments, the occurrence of a risk that falls into a predetermined "very high risk" range may automatically trigger a "high risk" assignment to the script.

If a component of the automation engine 410 determines in step 600 that the script risk exceeds a threshold value (that is, whether the risk to the proper operation of the computing environment is too high to allow the script to be run automatically), the system attempts to manually authorize the script to be run with steps 605-615.

Step 620 is performed only if engine 410 in step 600 determines that the script's risk does not exceed the threshold value. In this case, the automation engine 410 or another component of management platform 405 authorizes the script to be run.

In optional step 605, automation engine 410 may decide whether to unilaterally authorize the customized script to run despite the higher level of risk. In certain embodiments, this decision may be done by methods of artificial intelligence. For example, automation engine 410 may make this decision by applying rules learned through machine-learning sessions that had previously trained engine 410 to intelligently determine whether a customized script is too dangerous to authorize.

In embodiments that support both manual and cognitive methods of obtaining special authorization, automation engine 410 may automatically choose between methods, or choose whether to attempt automated special authorization in step 605, as a function of preset conditions. Examples of such conditions include: choosing an authorization method as a function of: the total degree of risk presented by running the script; the context of the script or the risk factors, such as whether the high-risk customization steps risk disrupting a mission-critical resource of the operating environment 4000; and whether extrinsic conditions exist that have in the past been associated with severe disruptions when running a similar type of scripts.

In step 610, the system determines whether automation engine 410 has granted the customized script special authorization to be run, despite higher degrees of risk presented by the script.

In step 615, if automation engine 410 did not grant special authorization to run the customized script in step 605, engine 410 optionally submits the customized script to a human expert, specialist, or administrator for manual authorization. Some embodiments may omit this step, or may omit this step once automation engine 410 is deemed to have been sufficiently trained to be able to automatically determine whether special authorization should be granted. In some embodiments, the expert, specialist, or administrator may be a distinct software agent, artificially intelligent program, or other computerized entity that has been more extensively trained in the field of system security and maintenance.

In response to this submission, the expert, specialist, or administrator will return a special authorization or a denial of special authorization to the automation engine 410. In some embodiments, this authorization will be made conditional upon the performance of further customization steps upon the script. In this latter case, the methods of FIGS. 5 and 6 would return to step 520 of FIG. 5 and the current procedure would resume with a new iteration of steps 525-545.

In step 625, automation engine 410 determines whether the customized script has been granted authorization to run in any of steps 600-615.

In step 630, if automation engine 410 has determined that the customized script has been granted authorization to be run, automation engine 410 runs the script and customization recorder 425 records the results. These results may comprise identifications of whether the script resolved issues caused by the unexpected event and whether specific steps of the script disrupted the normal operation of computing environment 4000.

In step 635, automation engine 415 updates script library 420 as necessary in order to document previous actions taken to the retrieved script. This updating may include storing the customized script, along with notations or metadata, even if the script was not run.

In step 640, the training data that had been recorded throughout performance of the methods of FIGS. 5 and 6 is added to a training corpus 435 that will be used to train customization module 415.

This recorded data may comprise:
- an identification of the script retrieved from script library 420 in step 505
- the customized script
- each customization step extracted in step 530
- a level of risk assigned to the customized script and to each customization step
- whether the customized script was run
- a reason why the customized script was authorized to run (such as being assigned a lower risk, being automatically authorized by the automation engine in step 510 or 605
- any results that occurred as a result of running the script, and additional correlations between results produced by the script, individual customization steps, or risk levels of the script or of individual customization steps.

Some embodiments may also include other data, correlations, or inferences that are deemed by an implementer to be useful for training customization module 415.

In step 645, machine-learning training module 430 initiates a machine-learning training session by submitting the updated corpus 440 to customization module 415. Module 415 gains additional expertise from this training that teaches the module how to better predict levels of risk of producing undesirable effects when customizing and running automation scripts.

One goal of certain embodiments is to sufficiently train automation engine 410 such that engine 410 is able to automatically select scripts in response to notice of an unexpected error, perform complex, context-sensitive customizations upon a selected script, and then run the customized script with an acceptable degree of certainty that the script will resolve issues caused by the unexpected error without significant risk of disrupting resources or operations of computing environment 4000.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A cognitive automation-engine system comprising a processor, a memory coupled to the processor, and a computer-readable hardware storage device coupled to the processor, the storage device containing program code configured to be run by the processor via the memory to implement a method for machine-trainable automated-script customization, the method comprising:

the processor initiating a customization procedure that comprises identifying customization steps capable of refining a selected automation script into a customized script that more specifically addresses a disruption to an operation of a computing environment, where the selected automation script is selected from a library of existing scripts, and where the identifying comprises:

the processor directing the customization-recording module to record actions, by a human expert, taken during the course of the customization procedure to address the disruption; and the processor directing the customization component to intelligently infer the customization steps from the recording and from a comparison of the selected automation script to a candidate customized script that would be generated by applying, to the selected automation script, recorded actions performed to address the disruption;

the processor generating a customized script by applying the customization steps to the selected automation script;

the processor updating a machine-learning corpus with a characterization of the customized script; and the processor, by submitting the updated corpus to a machine-learning training component of the automation engine, training a customization component of the automation engine to intelligently customize automation scripts.

2. The system of claim 1, further comprising:

the processor identifying a relative risk of each customization step, where the relative risk of a first customization step identifies a relative likelihood that running a candidate automation script comprising an instruction associated with the first customization step would adversely affect operation of the computing environment;

the processor deriving, as a function of the relative risks of all customization steps, an aggregate risk that running the customized script would adversely affect operation of the computing environment;

the processor determining whether the aggregate risk exceeds a threshold acceptable level of risk;

the processor responding to a determination that the aggregate risk does not exceed the threshold risk by running the customized script, adding the customized script to a script library, and directing a customization-recording module of the automation engine to record a result produced by running the customized script; and the processor responding to a determination that the aggregate risk does exceed the threshold risk by:

requesting extrinsic authorization to run the customized script, and if receiving the extrinsic authorization, running the customized script, adding the customized script to the script library, and directing the customization-recording module to record a result produced by running the customized script.

3. The system of claim 1, where the initiating the customization procedure comprises:

the processor directing a human expert to perform actions that address the disruption.

4. The system of claim 1, where the initiating the customization procedure comprises:

the processor directing the customization component to automatically identify the customization steps without human intervention; and the processor, if determining that the customization component is unable to automatically identify the customization steps, directing a human expert to perform actions that address the disruption.

5. The system of claim 1, where machine-learning training sessions have trained the customization component to intelligently identify the relative likelihood that running the candidate automation script would adversely affect operation of the computing environment, where the intelligent identification is performed as a function of historical records comprised by one or more corpora submitted to the customization component during the machine-learning training sessions, and where the historical records indicate how often running a script comprising the instruction has in the past produced a result that adversely affected operation of the computing environment.

6. The system of claim 1, where values of the aggregate risk and of each relative risk are selected from the group consisting of: Unacceptably High Risk, High Risk, Moderate Risk, Low Risk, and No Risk.

7. The system of claim 1, where the updating further comprises adding, to the corpus, identifications of items selected from the group consisting of:
an unexpected event that created the disruption, the selected automation script, the customized script, the customization steps, the aggregate risk, the relative risks, and any results produced by running the customized script.

8. A method for machine-trainable automated-script customization, the method comprising:
a processor of a cognitive automation engine initiating a customization procedure that comprises identifying customization steps capable of refining a selected automation script into a customized script that more specifically addresses a disruption to an operation of a computing environment,
where the selected automation script is selected from a library of existing scripts, and
where the identifying comprises:
the processor directing the customization-recording module to record actions, by a human expert, taken during the course of the customization procedure to address the disruption; and
the processor directing the customization component to intelligently infer the customization steps from the recording and from a comparison of the selected automation script to a candidate customized script that would be generated by applying, to the selected automation script, recorded actions performed to address the disruption;
the processor generating a customized script by applying the customization steps to the selected automation script;
the processor updating a machine-learning corpus with a characterization of the customized script; and
the processor, by submitting the updated corpus to a machine-learning training component of the automation engine, training a customization component of the automation engine to intelligently customize automation scripts.

9. The method of claim 8, where the initiating the customization procedure comprises:
the processor directing a human expert to perform actions that address the disruption.

10. The method of claim 8, where the initiating the customization procedure comprises:
the processor directing the customization component to automatically identify the customization steps without human intervention; and
the processor, if determining that the customization component is unable to automatically identify the customization steps, directing a human expert to perform actions that address the disruption.

11. The method of claim 8,
where machine-learning training sessions have trained the customization component to intelligently identify the relative likelihood that running the candidate automation script would adversely affect operation of the computing environment,
where the intelligent identification is performed as a function of historical records comprised by one or more corpora submitted to the customization component during the machine-learning training sessions, and
where the historical records indicate how often running a script comprising the instruction has in the past produced a result that adversely affected operation of the computing environment.

12. The method of claim 8, further comprising:
the processor identifying a relative risk of each customization step, where the relative risk of a first customization step identifies a relative likelihood that running a candidate automation script comprising an instruction associated with the first customization step would adversely affect operation of the computing environment;
the processor deriving, as a function of the relative risks of all customization steps, an aggregate risk that running the customized script would adversely affect operation of the computing environment;
the processor determining whether the aggregate risk exceeds a threshold acceptable level of risk;
the processor responding to a determination that the aggregate risk does not exceed the threshold risk by running the customized script, adding the customized script to a script library, and directing a customization-recording module of the automation engine to record a result produced by running the customized script; and
the processor responding to a determination that the aggregate risk does exceed the threshold risk by:
requesting extrinsic authorization to run the customized script, and
if receiving the extrinsic authorization, running the customized script, adding the customized script to the script library, and directing the customization-recording module to record a result produced by running the customized script.

13. The method of claim 8, where the updating further comprises adding, to the corpus, identifications of items selected from the group consisting of:
an unexpected event that created the disruption, the selected, the selected automation script, the customized script, the customization steps, the aggregate risk, the relative risks, and any results produced by running the customized script.

14. The method of claim 8, further comprising providing at least one support service for at least one of creating, integrating, hosting, maintaining, and deploying computer-readable program code in the computer system, wherein the computer-readable program code in combination with the computer system is configured to implement the initiating, the generating, the updating, and the submitting.

15. A computer program product, comprising a computer-readable hardware storage device having a computer-readable program code stored therein, the program code configured to be executed by cognitive automation engine system comprising a processor, a memory coupled to the processor, and a computer-readable hardware storage device coupled to the processor, the storage device containing program code configured to be run by the processor via the memory to implement a method for machine-trainable automated-script customization, the method comprising:
the processor initiating a customization procedure that comprises identifying customization steps capable of refining a selected automation script into a customized script that more specifically addresses a disruption to an operation of a computing environment,
where the selected automation script is selected from a library of existing scripts, and
where the identifying comprises:
the processor directing the customization-recording module to record actions, by a human expert, taken during the course of the customization procedure to address the disruption; and the processor directing the customization component to intelligently infer the customization steps from the recording and from a comparison of the selected automation script to a candidate customized script that would be generated by applying, to the selected automation script, recorded actions performed to address the disruption;

the processor generating a customized script by applying the customization steps to the selected automation script;

the processor updating a machine-learning corpus with a characterization of the customized script; and the processor, by submitting the updated corpus to a machine-learning training component of the automation engine, training a customization component of the automation engine to intelligently customize automation scripts.

16. The computer program product of claim 15, where the initiating the customization procedure comprises:

the processor directing the customization component to automatically identify the customization steps without human intervention; and the processor, if determining that the customization component is unable to automatically identify the customization steps, directing a human expert to perform actions that address the disruption.

17. The computer program product of claim 15, where machine-learning training sessions have trained the customization component to intelligently identify the relative likelihood that running the candidate automation script would adversely affect operation of the computing environment, where the intelligent identification is performed as a function of historical records comprised by one or more corpora submitted to the customization component during the machine-learning training sessions, and where the historical records indicate how often running a script comprising the instruction has in the past produced a result that adversely affected operation of the computing environment.

18. The computer program product of claim 15, further comprising:

the processor identifying a relative risk of each customization step, where the relative risk of a first customization step identifies a relative likelihood that running a candidate automation script comprising an instruction associated with the first customization step would adversely affect operation of the computing environment;

the processor deriving, as a function of the relative risks of all customization steps, an aggregate risk that running the customized script would adversely affect operation of the computing environment;

the processor determining whether the aggregate risk exceeds a threshold acceptable level of risk;

the processor responding to a determination that the aggregate risk does not exceed the threshold risk by running the customized script, adding the customized script to a script library, and directing a customization-recording module of the automation engine to record a result produced by running the customized script; and the processor responding to a determination that the aggregate risk does exceed the threshold risk by:

requesting extrinsic authorization to run the customized script, and if receiving the extrinsic authorization, running the customized script, adding the customized script to the script library, and directing the customization-recording module to record a result produced by running the customized script.

19. A cognitive automation-engine system comprising a processor, a memory coupled to the processor, and a computer-readable hardware storage device coupled to the processor, the storage device containing program code configured to be run by the processor via the memory to implement a method for machine-trainable automated-script customization, the method comprising:

the processor receiving notice that an unexpected event has occurred that creates a disruption to an operation of a computing environment;

the processor selecting an automation script that is adapted to address a class of issues associated with the disruption;

the processor initiating a customization procedure that comprises identifying customization steps capable of refining a selected automation script into a customized script that more specifically addresses a disruption to an operation of a computing environment, where the selected automation script is selected from a library of existing scripts, and where the identifying comprises:

the processor directing the customization-recording module to record actions, by a human expert, taken during the course of the customization procedure to address the disruption; and the processor identifying a relative risk of each customization step identified by the customization procedure, where the relative risk of a first customization step identifies a relative likelihood that running a candidate automation script comprising an instruction associated with the first customization step would adversely affect operation of the computing environment, where the identifying the relative risk of the first customization step comprises determining whether the first customization step is listed in one or more whitelists or blacklists, and where each whitelist enumerates script-customization steps known to be lower in risk and each blacklist enumerates script-customization steps known to be higher in risk;

the processor generating a customized script by applying the script-customization steps to the selected automation script;

the processor deriving, as a function of the relative risks of all customization steps, an aggregate risk that running the customized script would adversely affect operation of the computing environment;

the processor identifying a relative risk of each customization step, where the relative risk of a first customization step identifies a relative likelihood that running a candidate automation script comprising an instruction associated with the first customization step would adversely affect operation of the computing environment;

the processor deriving, as a function of the relative risks of all customization steps, an aggregate risk that running the customized script would adversely affect operation of the computing environment;

the processor determining whether the aggregate risk exceeds a threshold acceptable level of risk;

the processor responding to a determination that the aggregate risk does not exceed the threshold risk by running the customized script, adding the customized script to a script library, and directing the customization-recording module of the automation-engine system to record a result produced by running the customized script;

the processor responding to a determination that the aggregate risk does exceed the threshold risk by:
  requesting extrinsic authorization to run the customized script, and
    if receiving the extrinsic authorization, running the customized script, adding the customized script to the script library, and directing the customization-recording module to record a result produced by running the customized script;

the processor updating a machine-learning corpus with a characterization of the customized script;

the processor submitting the updated version of the machine-learning corpus to a customization component of the automation-engine system in order to train the customization component to intelligently customize automation scripts; and the processor directing the customization component to intelligently infer the customization steps from the recording and from a comparison of the selected automation script to a candidate customized script that would be generated by applying, to the selected automation script, recorded actions performed to address the disruption.

20. The system of claim 19,
where machine-learning training sessions have trained the customization component to intelligently identify the relative likelihood that running the candidate automation script would adversely affect operation of the computing environment,
where the intelligent identification is performed as a function of historical records comprised by one or more corpora submitted to the customization component during the training sessions, and
where the historical records indicate how often running a script comprising the instruction has in the past produced a result that adversely affected operation of the computing environment.

21. A cognitive automation-engine system comprising:
a processor;
a memory coupled to the processor;
a computer-readable hardware storage device coupled to the processor, the storage device containing program code configured to be run by the processor via the memory to implement a method for machine-trainable automated-script customization;
a script library that stores previously recorded automation scripts;
a customization recorder that monitors and records identifications of:
  an unexpected event that produces an adverse effect on a computing environment,
  a selection of a previously stored automation script from the script library,
  a customized script generated by applying customization steps to the selected script,
  actions performed by a human expert to address a disruption to an operation of the computing environment, from which may be inferred, through cognitive methods, the customization steps,
  a relative risk that running an automation script comprising an instruction associated with a first customization step of the customization steps would adversely affect the operation of the computing environment, and
  an aggregate risk that running the customized script would adversely affect the operation of the computing environment;
an engine-training module that trains a customization module to intelligently customize automation scripts;
one or more corpora submitted to the customization module by the engine-training module during machine-learning training sessions; and
the customization module, which, in response to receiving notice that the unexpected event has occurred:
  selects, from the script library, an automation script that is adapted to address a class of issues associated with a disruption, to the computing environment, caused by the unexpected event;
  initiates a customization procedure that comprises identifying the customization steps,
    where applying the customization steps to the selected automation script refines the selected automation script into the customized script, and
    where the customized script more specifically addresses the disruption caused by the unexpected event;
  generates the customized script by applying the customization steps to the selected automation script by intelligently inferring the customization steps from the recorded actions and from a comparison of the selected script to a candidate customized script that would be generated by applying, to the selected script, the recorded actions performed to address the disruption;
  associates each customization step with a relative degree of risk of disrupting the computing environment;
  derives, as a function of all risks associated with the customization steps, an aggregate risk that running the customized script will disrupt the computing environment;
  determines whether the aggregate risk exceeds a threshold acceptable level of risk;
  responds to a determination that the aggregate risk does not exceed the threshold risk by:
    running the customized script,
    adding the customized script to the script library, and
    directing the customization recorder to record a result produced by running the customized script;
  responds to a determination that the aggregate risk does exceed the threshold risk by:
    requesting extrinsic authorization to run the customized script, and
      if receiving the extrinsic authorization:
        running the customized script,
        adding the customized script to the script library, and
        directing the customization recorder to record a result produced by running the customized script;
  updates a machine-learning corpus of the one or more corpora with a characterization of the customized script; and
  directing the engine-training module to use the updated machine-learning corpus, during the next machine-learning training session, to further train the customization module to intelligently customize automation scripts.

* * * * *